Dec. 19, 1967   J. M. LAWRENCE   3,358,652
ROTARY ENGINE

Filed Sept. 7, 1965   3 Sheets-Sheet 1

INVENTOR.
JOHN M. LAWRENCE
BY
Fryer Tjensold Fix & Phillips
ATTORNEYS

Dec. 19, 1967  J. M. LAWRENCE  3,358,652
ROTARY ENGINE

Filed Sept. 7, 1965  3 Sheets-Sheet 2

INVENTOR.
JOHN M. LAWRENCE
BY
Fryer Tjensvold Feix & Phillips
ATTORNEYS

Dec. 19, 1967  J. M. LAWRENCE  3,358,652
ROTARY ENGINE

Filed Sept. 7, 1965  3 Sheets-Sheet 3

INVENTOR.
JOHN M. LAWRENCE
BY
*Fryer Tjensvold Fix & Phillips*
ATTORNEYS

United States Patent Office 3,358,652
Patented Dec. 19, 1967

3,358,652
ROTARY ENGINE
John M. Lawrence, 11379-A3 Columbia Pike,
Silver Spring, Md. 20904
Filed Sept. 7, 1965, Ser. No. 485,352
9 Claims. (Cl. 123—8)

ABSTRACT OF THE DISCLOSURE

A rotary internal combution engine having specially shaped rotors rotating within an engine casing. The work rotors are of a bilobed configuration that mesh with a transfer rotor of a ribbed configuration to form compartments therebetween as well as between the respective rotors and the engine casing. These compartments constantly change in volume as the rotors rotate whereby a fuel-air mixture is drawn into the compartment through an internal passage bored axially in the work rotor and opening into the compartment through ports in a portion of one lobe of the work rotor. The fuel-air mixture is progressively compressed, ignited and expanded against the work rotor and is finally exhausted from the engine via other ports in one lobe of the work rotor and an axial passage to the atmosphere.

---

The present invention relates to rotary internal combustion engines and more particularly to such rotary engines wherein specially shaped rotors interact to form chambers of changing volume as the engine parts rotate.

Rotary internal combustion engines have long been known in the art, however up to the present time, they have gained only limited acceptance as prime movers. Such rotary engines have been beset by problems such as low efficiency, excessively complicated construction, poor aspiration and exhaust of the air fuel mixture, poor internal sealing within the engine, and low power output. The present invention provides an internal combustion rotary engine wherein sealing problems between the parts are eliminated; wherein all motion is rotational and uniform in speed; wherein fuel aspiration is efficient; and wherein the engine has a high volumetric efficiency.

It is therefore an object of the present invention to provide a rotary engine having a high mechanical efficiency because all engine part motions are at constant speed and because none of the moving or stationary parts touch one another, thus achieving low internal friction.

It is another object of the invention to provide an internal combustion rotary engine having intake and exhaust ports large in volume in relation to the "displacement" volume, whereby a high volumetric efficiency is achieved.

It is another object of the invention to provide an internal combustion rotary engine utilizing intermeshing work rotors and transfer rotors.

It is yet another object of the invention to provide an internal combustion rotary engine having at least four power impulses per revolution of the output shaft.

It is yet another object of the invention to provide a rotary internal combustion engine which has no reciprocating parts, is simple in form, and is capable of operating safely and efficiently at high speeds.

It is still another object of the invention to provide a rotary internal combustion engine having power or work rotors and a transfer rotor which are operatively connected together and wherein the work rotors have intake and exhaust passages and wherein such intake and exhaust passages cooperate with compartments in the transfer rotor and with the surrounding engine case to form moving compartments that continually change capacity in a novel way whereby such compartments are efficiently filled with a combustible mixture and voided of burnt gases.

A still further object of the invention is to provide an internal combustion rotary engine wherein each work rotor is so designed that an explosive charge of fuel and air contained by a moving compartment will progress in a continuous loop around the rotor from intake ports therein, then around the compression lobe of the rotor and finally to exhaust ports located in the work rotor.

It is yet another object of the invention to provide a rotary internal combustion engine which produces a much larger amount of power per unit weight and per unit volume than is possible with existing reciprocating piston type engines due to the fact that the rotary engine of the invention operates at much higher speeds than are possible in piston type engines.

Other objects and advantages of the invention will become apparent from the specification and claims following, and in addition with reference to the drawings of which:

Figure 2:
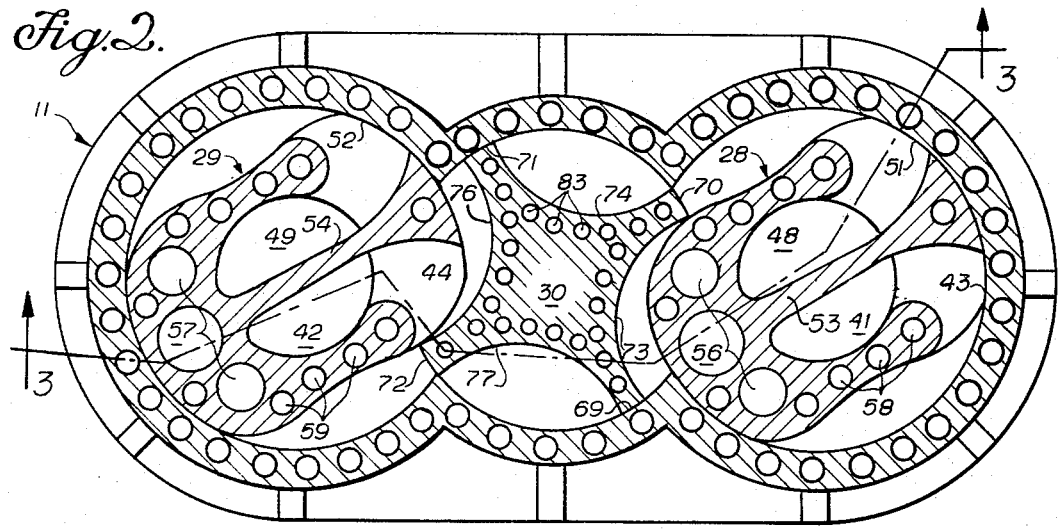
FIG. 2 is a cross-sectional view of the engine taken in a plane at right angles to the axis of the rotors and approximately midway between the upper and lower cover plates of the engine casing.
Figure 3:
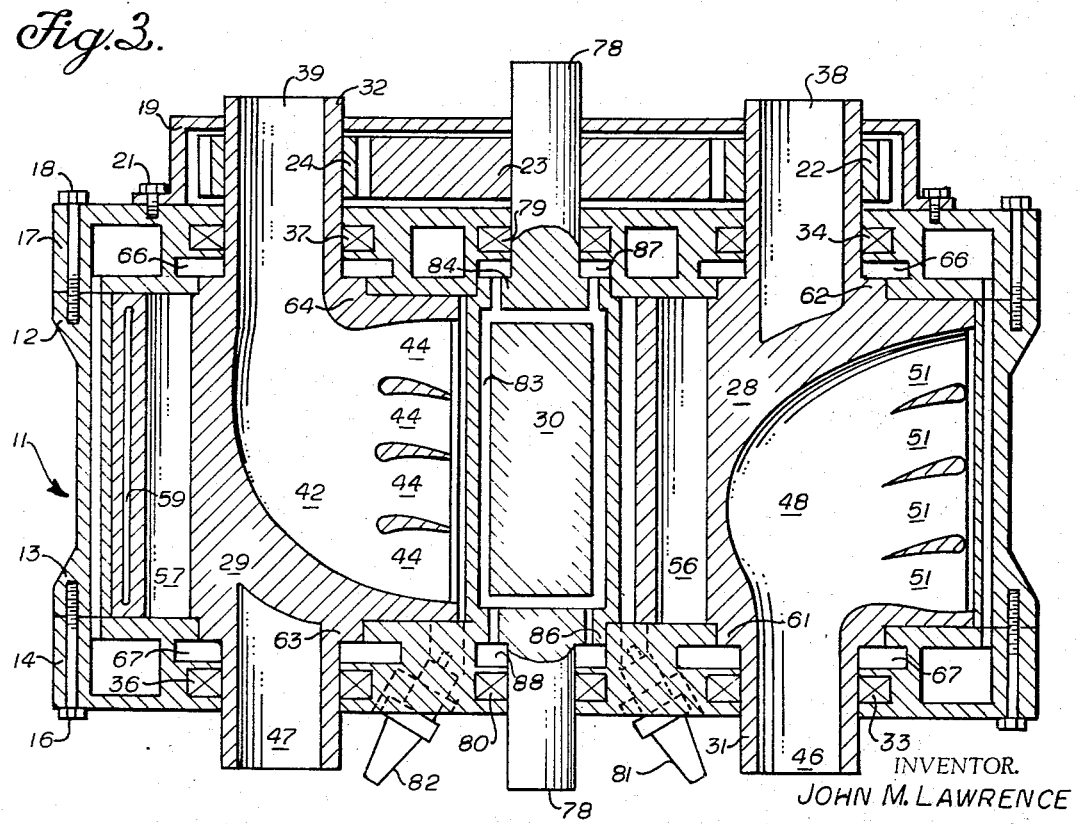

FIG. 3 is a cross-sectional view of the engine taken in a plane essentially parallel with the axes of the rotors and in a position indicated by line 3—3 of FIG. 2; and FIGS. 4–12 are schematic views illustrating the interaction of a work rotor and the transfer rotor for one complete revolution of the work rotor and further illustrating the travel and changing shape of the fuel compartments as they revolve within the engine.

Figure 1:
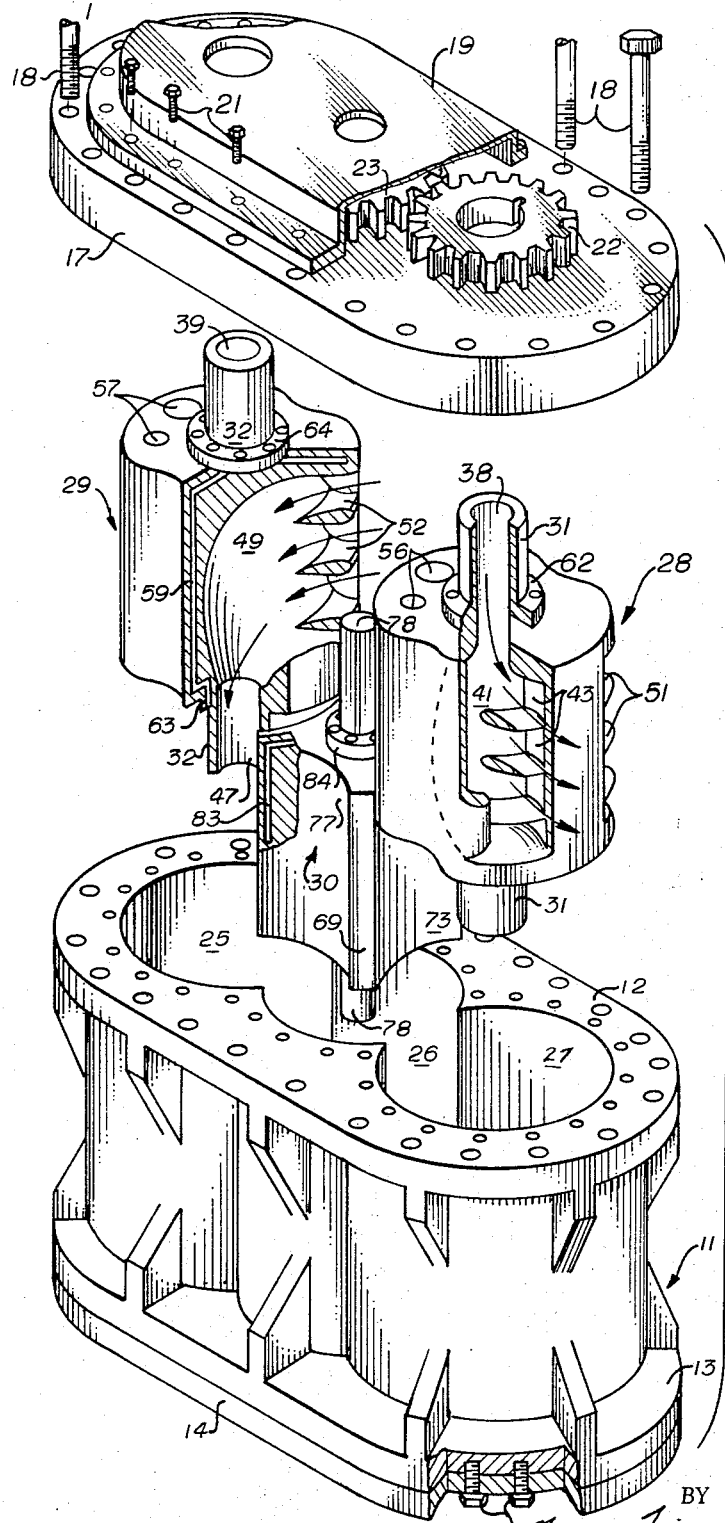
FIG. 1 is an exploded three-dimensional view of the engine of the invention illustrating the engine casing, work rotor and transfer rotor and other accompanying parts.

With reference to FIGS. 1, 2 and 3, the rotary engine of the invention comprises an engine casing 11, having a generally elliptical configuration, and integral flanges 12 and 13 formed into either end thereof. A bottom end plate 14 is secured to bottom flange 13 by suitable fastening means such as bolts 16. An upper end plate 17 is also suitably secured to upper flange 12 by bolts 18.

A gear and lubricant housing 19 is secured to upper end plate 17 as by bolts 21. Gears 22, 23, and 24 are enclosed by housing 19, and the function of such gears will be explained later hereinafter.

Referring to FIGS. 1 and 2, it will be seen that the inner wall of engine casing 11 is formed into three interconnecting cylindrical chambers 25, 26 and 27. All three chambers have their axes in the same plane and, in addition, middle chamber 26, which is disposed between outer chambers 25 and 27, opens into both said chambers at diametrically opposite sides whereby all three chambers form one continuous chamber within case 11.

The principal moving parts of the rotary engine comprise two work rotors 28 and 29 and a single transfer rotor 30. Work rotors 28 and 29 are of an identical configuration, specifically being of a bilobed construction with vertical shafts 31 and 32 extending axially beyond either end of rotors 28 and 29 respectively. The outer portions of the lobes of work rotors 28 and 29 are formed generally in a circular configuration, the radius of which is very slightly less than the radius of chambers 25 and 27. In addition, shafts 31 and 32 of work rotors 28 and 29 pass through bearings 33, 34, 36 and 37 suitably centered in end plates 14 and 17, whereby work rotors 28 and 29 are held axially within chambers 25 and 27, and whereby they may rotate freely therein.

Axially extending shafts 31 and 32 are hollowed out at their upper ends to form fuel inlet passages 38 and 39. Inlet passages 38 and 39 extend axially part way through shafts 31 and 32 to form fuel inlet compartments 41 and 42. Inlet compartments 41 and 42 in turn terminate on a radial surface of work rotors 28 and 29 in inlet ports 43 and 44 respectively.

The lower ends of shafts 31 and 32 are similarly hollowed out to form exhaust passages 46 and 47 respectively. Exhaust passages 46 and 47 pass up through work rotors 28 and 29 to form exhaust compartments 48 and 49 and in turn terminate in exhaust ports 51 and 52 formed into the peripheral surface of the rotors.

It will be noted that each work rotor 28 and 29 contains both inlet and exhaust passages, compartments and ports; that such exhaust passages, compartments and ports are all within the work rotor, but are completely separated one from the other by metal webs 53 and 54 respectively. In addition, it will be noted that the exhaust and inlet ports of each work rotor are formed into but one lobe of the bilobed configuration.

Weight compensating holes 56 and 57 are drilled into the lobe of work rotors 28 and 29, respectively, remote from the inlet and exhaust ports. These holes are drilled to remove enough metal from the rotor lobes to compensate for the metal removed in forming exhaust and inlet compartments and ports in the work rotors. Thus, the work rotor is dynamically balanced as to rotation about the shafts 31 and 32.

In addition, as shown in FIGS. 1 and 2, coolant passages 58 and 59 are drilled at intervals through the body of work rotors 28 and 29. These coolant passages terminate in collars 61, 62, 63 and 64 located at the juncture of shafts 31 and 32 with the upper and lower ends of work rotors 28 and 29. The coolant passage openings in the collars in turn communicate with coolant chambers 66 and 67 formed into upper end plate 17 and lower end plate 14 respectively.

Centered between work rotors 28 and 29 and axially within engine chamber 26 is transfer rotor 30. Transfer rotor 30 is generally of a ribbed construction, however being modified in form in that the ribs are interconnected by concavely curved arcuate portions. Specifically, as shown in the drawings, transfer rotor 30 comprises four ribs 69, 70, 71 and 72 with a concavely curved arcuate portion 73 interconnecting the ribs 69 and 70; arcuate portion 74 interconnecting ribs 70 and 71; arcuate portion 76 interconnecting ribs 71 and 72; and arcuate portion 77 interconnecting ribs 72 and 69.

A solid shaft 78 forms the axis of transfer rotor 30 and extends beyond both ends of the rib-arcuate portion of the rotor. Transfer rotor 30 is held in position within chamber 26 by bearings 79 and 80 formed into upper and lower end plates 17 and 14 respectively. It should be noted that the ribs 69, 70, 71 and 72 of transfer rotor 30 extend outwardly from the axis of the rotor at 90° intervals around the periphery thereof, and are of a radial length such that they are very slightly shorter than the radius of chamber 26.

Transfer rotor 30 and work rotors 28 and 29 are interconnected mechanically by gears 22, 23 and 24. Gears 22 and 24 are affixed to the end of shafts 31 and 32 respectively where the shafts pass through upper plate 17 and cover 19. Similarly gear 23 is affixed to the end of shaft 78 of transfer rotor 30 in the same position. Gears 22, 23 and 24 are cut so that for every single revolution of transfer rotor 30 work rotors 28 and 29 pass through two revolutions. In other words, work rotors 28 and 29 rotate twice as fast as transfer rotor 30.

It should be further noted that the gears retain all three rotors in the same relative positions at all times whereby both work rotors face in the identical direction, that is, the inlet and outlet ports occupy the same angular position at all times with reference to any vertical plane passing through the engine. Thus, if the center rib 53 of work rotor 28 and the associated inlet port 43 are facing to the right in FIG. 2 of the drawing, then the center rib 54 and inlet port 44 of work rotor 29 will be in exactly the same relative position. These identical angular positions of the work rotors 28 and 29 remain constant regardless of what rotary position is occupied by either work rotor.

It should be noted also that transfer rotor 30 is retained in such a position by gear 23 that ribs 69, 70, 71 and 72, while rotating, very nearly, but not quite, touch the outer lobe surfaces of work rotors 28 and 29. The lobes of work rotors 28 and 29 are cut such that the ribs of transfer rotor 30 pass along the surfaces thereof without ever quite touching, while however maintaining a position in very close proximity to the work rotors at all times. This operation of transfer rotor 30 and the work rotors 28 and 29 is particularly well illustrated in FIGS. 4–12 of the drawings.

It will be apparent by referring to FIGS. 2 and 4–12 of the drawings that compartments are formed between work rotors 28, 29 and transfer rotor 30 as well as between work rotors 28, 29 and the inner surfaces of chambers 25 and 27 and between the arcuate portions of transfer rotor 68 and the inner surface of chamber 26. It will be further apparent that these compartments constantly change in volume and position as the engine parts rotate. The changing shape of these compartments is essential to the operation of the rotary engine of the invention, and in fact their function will be further explained hereinafter.

Spark plugs 81 and 82 are threaded into end plate 14 with their electrode ends extending into passages which enter into the bottom of chamber 26 at a position whereby the spark produced thereby will be accessible to the compartments formed between transfer rotor 30 and work rotors 28 and 29.

As will be seen by reference to FIG. 2, a number of coolant passages 83 are drilled into the main body of transfer rotor 30. All of the coolant passages 83 terminate in collars 84 and 86 formed at the junction of the main portion of transfer rotor 30 and shaft 78 at the upper and lower ends respectively thereof. The collars 84 and 86 place coolant passages 83 into communication with coolant chambers 87 and 88 in upper end plate 17 and lower end plate 14 of the engine housing respectively.

*Operation of the rotary engine*

The operation of the rotary engine may best be understood by reference to FIGS. 4–12 of the drawings which schematically illustrate the relative position of one work rotor 29 and transfer rotor 30 for one complete revolution of work rotor 29. It will be understood that work rotor 28 rotates radially in an identical manner with work rotor 29, however, with the difference being that it is one-half of a revolution out of phase with respect to work rotor 29 when both rotors are referenced to transfer rotor 30. However, the same phenomena as will be described hereinafter with respect to work rotor 29 also occur with respect to work rotor 28. It will be understood that these phenomena occur with respect to work rotor 28 exactly 180° out of phase with work rotor 29. In the figures work rotors 29 and 28 rotate in a counterclockwise direction, while transfer rotor 30 rotates in a clockwise direction.

Figure 4:
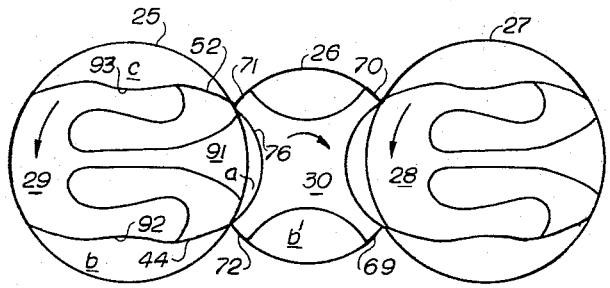

FIGS. 4–12 show three moving compartments a, b, and c adjacent to work rotor 29. Moving compartment a is bounded by the scavenging lobe 91 of work rotor 29 and the arcuate wall 76 of transfer rotor 30. Moving compartment b is bounded by the wall of chamber 25 and the intake side 92 of work rotor 29, and moving compartment c is bounded by the wall of chamber 25 and the expansion or exhaust side 93 of work rotor 29. In the instant of FIG. 4 intake ports 44 are in communication with moving compartments a and b, and exhaust ports 52 are in communication with moving compartments a and c. The changing shape and position of each of the moving compartments *a*, *b* and *c* are shown for one full revolution of the work rotor 30. It is important to notice that even though the capacity of one of the recesses in the transfer rotor 30 may be added to or separated from a given moving compartment the identity of each compartment is always maintained.

A fundamental feature of the engine is the difference between the rate at which the work rotor revolves and the rate at which the compartments move. While work rotor 29 completes a full counterclockwise revolution from FIGS. 4–12, due to the interaction of the transfer rotor each moving compartment adjacent to the work rotor is carried around the axis of the work rotor less than a full revolution. At the end of the revolution in FIG. 12 each moving compartment occupies the position of the moving compartment which was immediately clockwise from it in FIG. 4 at the start of the revolution. For example, moving compartment *a* is so transformed during a revolution of the work rotor that in FIG. 12 it occupies the same position as does moving compartment *b* in FIG. 4. Similarly, moving compartment *b* in FIG. 4 changes through the same revolution of the work rotor so that in FIG. 12 it is in the same position as moving compartment *c* in FIG. 4, and at the same time moving compartment *c* in FIG. 4 has been changed so that in FIG. 12 it occupies the same position as does moving compartment *a* in FIG. 4. Although each of these three transformations take place simultaneously through the same revolution of the work rotor, it is easy to see that through three revolutions of the work rotor a single compartment must progress consecutively through each of these three transformations. It will be shown that this whole cycle of transformations for a moving compartment through three full revolutions of the work rotor accomplish a complete thermodynamic cycle in the engine.

Figure 5:
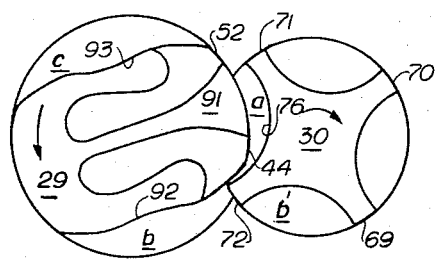
Figure 6:
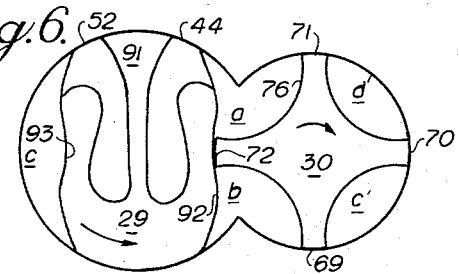
Figure 7:
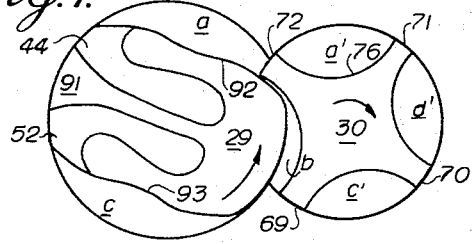

Moving compartment *a* in FIG. 4 shall arbitrarily be chosen as the starting point of a typical cycle. In FIGS. 5, 6 and 7 compartment *a* is increasing in capacity while it is in exclusive communication with the intake ports 44, drawing a mixture of fuel and air into the compartment. At the instant of FIG. 7, part of the mixture of fuel and air in compartment *a* is being separated from the remaining compartment becoming entrapped in recess *a'* of the transfer rotor. The manner in which these trapped gases are utilized will be described later.

Figure 8:
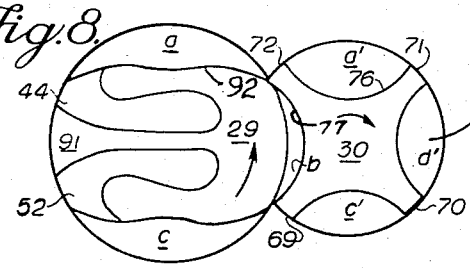

The remaining moving compartment *a* has in FIG. 8 increased to full capacity. In this position it is bounded by the wall of work rotor chamber 25 and the intake side 92 of work rotor 29 as well as the intake ports 44. These boundaries are maintained through FIGS. 9, 10, 11 and 12 as moving compartment *a* is revolved around the work rotor casing. This interval of time is, in effect, a dwell period. Thus, even at high speeds there is ample opportunity in this period for the pressures to equalize between moving compartment *a* and the inlet passage 42 as fuel and air continue to flow through the inlet ports 44. FIG. 12 completes the first revolution of the work rotor and it is evident that in this revolution the transformations of moving compartment *a* accomplish the intake phase of the engine.

As was previously indicated moving compartment *a* must in the second revolution progress through the same series of transformations as does moving compartment *b* in FIGS. 4 through 11. For purposes of explanation it will be assumed that moving compartment *b* as shown in FIGS. 4 through 12 is actually moving compartment *a* in the second revolution. If this is assumed, then compartment *b* in FIG. 4 is identical with moving compartment *a* in FIG. 12 and contains a mixture of fuel and air.

Before proceeding with the transformations of moving compartment *b* it is necessary to ascertain the contents of recess *b* in the transfer rotor as shown in FIG. 4 which by the rotation of the transfer rotor is approaching moving compartment *b*. This is easily done by establishing the correlation between this recess and recess *a'* shown in FIG. 8. The physical relationship in FIG. 4 between recess *b'* in the transfer rotor and work rotor 28 is the same as the relationship between recess *a'* and work rotor 29 in FIG. 8. Also, in both cases the recesses are receding from the aforementioned work rotors. It was pointed out earlier that in diagrams previous to FIG. 8 recess *a'* in the transfer rotor entraps a mixture of fuel and air. Since the conditions are the same for both cases it is clear that recess *b'* in FIG. 4 must also contain a mixture of fuel and air.

In the interval of time between FIGS. 4 and 5, moving compartment *b* is shut off from communication with the intake ports 44 as compartment *b* enters the compression phase of the cycle. From FIGS. 5 through 8 the contents of recess *b'* in the transfer rotor are combined with the contents of moving compartment *b* and the total quantity of fuel and air are compressed between the compression lobe of work rotor 29 and transfer rotor 30. In FIG. 8 the mixture has reached full compression as moving compartment *b* has reached its smallest limiting capacity and is defined by the compression lobe of the work rotor 29 and arcuate wall 77 of the transfer rotor.

At the instant shown in FIG. 8, or immediately before, the compressed mixture of fuel and air are ignited by spark plug 82 (see FIG. 3). From FIGS. 8 to 11 work is done on the work rotor by the pressure of the hot gases acting on the exhaust side of work rotor 29 as the work rotor turns and moving compartment *b* increases in capacity.

Figure 11:
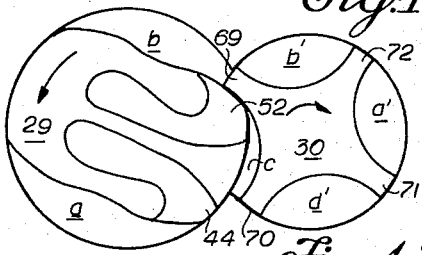
Figure 12:
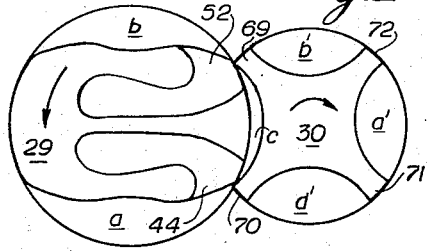

In FIG. 11, moving compartment *b* with its burned and burning fuel mixture has increased to near its full capacity and part of the expanded gases are being entrapped by recess *b'* in the transfer rotor.

Between FIGS. 11 and 12 the remaining gases in compartment *b* are exposed to exhaust ports 52 and the exhaust phase of the engine begins to take place. In retrospect it can be seen that the transformations of moving compartment *b* accomplish the compression, firing, and expansion phases of the thermodynamic cycle of the engine.

In like manner as before it is assumed that moving compartment *c* in FIGS. 4 through 12 is equivalent to moving compartment *b* in its next revolution. Of course the transformations of moving compartment *c* are also those of the original compartment *a* in its third revolution. Therefore, in FIG. 4 moving compartment *c* contains exhaust gases. It is bounded by the wall of chamber 25 and the exhaust side 93 of the work rotor 29. From FIGS. 4 through 8 the shape and boundaries of compartment *c* do not change and the compartment remains in communication with exhaust ports 52. As is the case with the intake phase this period of rotation allows pressures to equalize between moving compartment *c* and the exhaust passage 49 as exhaust gases continue to flow out the exhaust ports 52.

In FIG. 8 the recess *c'* in the transfer rotor which is approaching the work rotor contains exhaust gases previously removed from the interaction of transfer rotor 30 and the other work rotor 28. Following FIG. 8 these gases are combined with the exhaust gases remaining in moving compartment *c*. From FIGS. 8 through 12 moving compartment *c* is reduced in capacity and all the exhaust gases are swept out the exhaust ports 52, with the exception of the small quantity which remains in FIG. 12 between the scavenging lobe of work rotor 29 and arcuate wall 73 in the transfer rotor. The transformations of moving compartment *c* therefore accomplish the exhaust and exhaust scavenging phase of the engine.

This then is the manner in which a single compartment behaves through three full revolutions of work rotor 29. It is understood that the same transformations take place in conjunction with the other work rotor 28, although 180° out of phase with rotor 29.

It is evident that three revolutions of a work rotor complete a full thermodynamic cycle. In addition it is clear that the ability to achieve both high speed and good breathing characteristics are also realized.

By carefully following the cycle of the rotary engine as described supra, it will be apparent that while the engine is operating, charges of fuel and air and charges of exhaust gas are entrapped in the recesses (a', b', c', d') of transfer rotor 30. These trapped gases are transferred from contact with work rotor 28 to work rotor 29 and vice versa. However, the exchanges are inherently coordinated with the events in the moving compartments (a, b, c) around the periphery of both work rotors 28 and 29 in such a manner that the operation always follows the pattern previously described. Thus, fuel and air mixtures transferred in the compartments of the transfer rotor meet and combine with fuel and air mixtures in the moving compartments a, b and c of the work rotors, and exhaust gases in the compartments transferred in transfer rotor 30 combine with exhaust gases in the moving compartments of the work rotors.

One power impulse is produced for each revolution of work rotors 28 and 29. Thus in a single revolution of transfer rotor 30, both work rotors 28 and 29 will receive two power impulses and produce a total of four power impulses altogether on the transfer rotor or output shaft 78. The power output of shaft 78 is taken from the engine for work purposes by any suitable means well known in the art.

Figure 9:
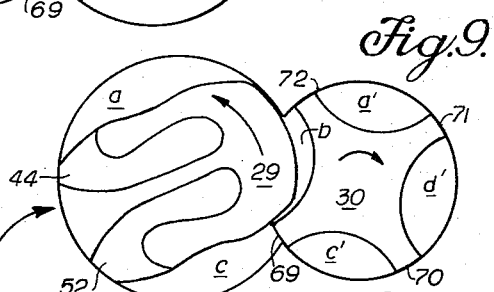
Figure 10:
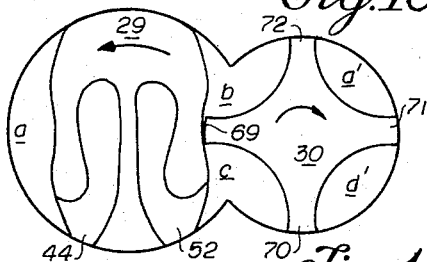

Due to the bilobed configuration of work rotors 28 and 29, and the ribbed configuration of transfer rotor 30, ribs 69, 70, 71 and 72 very closely follow the peripheral contour of work rotors 28 and 29. In fact, regardless of the relative angular position of work rotors 28 and 29 with transfer rotor 30, the ribs, while not being in contact with the peripheral surface of the work rotors, are actually in very close proximity thereto. Due to the unique construction of the rotary engine, all of the processes which are necessarily taking place in the moving compartments, such as compression, firing, expansion, etc., can take place without the necessity of seals or sealing members between the various engine components. For instance, consider the most critical situation for leakage between compartments. FIG. 9 shows moving compartment b immediately after firing. The most likely path for any small leakage which may occur from moving compartment b in FIG. 9 is between the edge of the transfer rotor rib 69 and the compression lobe of work rotor 29 because the partition is extremely narrow and the clearance is greater than rotor-to-wall clearances to allow for any possible backlash in the gears. However, any leakage of hot gases from moving compartment b to moving compartment c in FIG. 9 cannot produce pre-ignition of any of the gases because moving compartment c contains only exhaust gases. Further, the clearance between these parts is kept as small as possible to avoid loss in engine efficiency due to losses in combustion and expansion pressure.

A similar condition exists in FIG. 7 during the compression phase of the cycle whereby portions of any fuel and air which may leak from the moving compartment b escape to moving compartment c which already contains fuel and air at a lower pressure.

It will be apparent from a careful study of the specification that the engine need not be confined to a configuration of two work rotors and one transfer rotor. Thus, a greater number of work rotors may be added to the engine which would involve at the same time incorporating a greater number of recesses, that is, ribs and arcuate portions in the control transfer rotor. However, regardless of the number of work rotors incorporated into the engine, the functions of the work rotors and transfer rotor remain identical to the functions described heretofore with regard to the two work rotored engine configuration.

What is claimed is:
1. A rotary internal combustion engine comprising: an engine casing; at least one work rotor means rotatably mounted within said casing; transfer rotor means rotatably mounted within said casing and adapted to intermesh with said work rotor to form compartments therebetween; fuel ignition means threaded into said engine casing intermediate said work rotor means and said transfer rotor means; said engine casing and work rotor means further shaped to form additional compartments therebetween; means for operatively connecting said work rotor means and said transfer rotor means together; fuel-air mixture intake means and exhaust gas means formed interiorly into said work rotor means and adapted to connect with said compartments; said work rotor means, transfer rotor means and engine casing so shaped as to cause said compartments to rotate circumferentially within said casing and to cyclically increase to a maximum volume, remain constant, then progressively decrease in volume to a minimum, as said work rotor means and transfer rotor means rotate; whereby fuel-air mixture entering said compartments is successively drawn into said compartment, compressed, ignited, and expanded as said rotor means rotate.

2. A rotary internal combustion engine according to claim 1 wherein said work rotor means is constructed in a bilobed configuration wherein the outer peripheral surfaces of said lobes are of a radial length such that said surfaces rotate in sealing proximity to said engine casing; and wherein said work rotor is constructed with a narrowed waist portion connecting said lobes whereby two diametrically opposite compartments are formed between said waist portion of said work rotor and said engine casing.

3. A rotary internal combustion engine according to claim 2 wherein said transfer rotor has a ribbed configuration wherein said ribs are interconnected by concave arcuate segments and wherein said ribs are of a radial length such that said ribs rotate in sealing proximity to said engine casing and to the peripheral surfaces of said work rotor lobes; and wherein said arcuate segments are of a curvature greater than the peripheral surfaces of said work rotor lobes whereby, during rotation of said work rotor and said transfer rotor, compatments are formed between said work rotor lobe surfaces and said arcuae segments.

4. A rotary internal combustion engine according to claim 2 wherein said bilobed work rotor is rotatably supported within said engine casing by first and second shafts integral therewith and extending axially through bearings journaled into opposite ends of said engine casing; wherein a fuel-air mixture intake passage is formed axially within said first shaft, said intake passage having an intake opening external to said engine casing and intake passage outlet ports formed into a first half of the peripheral surface of one of said lobes of said work rotor; and wherein an exhaust gas passage is formed axially within said second shaft and having an exhaust opening external to said engine casing, and having exhaust entrance ports formed in a second half of the peripheral surface of one of said lobes of said work rotor.

5. A rotary internal combustion engine according to claim 3 wherein said engine casing is formed into a plurality of generally cylindrical chambers with each chamber merging into an adjacent chamber along a vertical segment common to both chambers; and with each chamber housing a single work rotor rotatably therewithin; and said adjacent chamber housing a transfer rotor therewithin.

6. A rotary internal combustion engine according to claim 5 wherein coolant passages are formed into the peripheral walls of said casing.

7. A rotary engine according to claim 5 wherein coolant passages are formed into said work rotors and said transfer rotor and wherein coolant is circulated in and out of said work rotors and transfer rotor passages from coolant galleries formed into said engine casing.

8. A rotary internal combustion engine according to claim 1 wherein the means for operatively connecting said work rotor means to said transfer rotor means is geared to rotate said work rotor means at twice the angular velocity of the transfer rotor means.

9. A rotary internal combustion engine comprising: an engine casing; at least one work rotor means rotatably mounted within said casing; transfer rotor means rotatably mounted within said casing and adapted to intermesh with said work rotor to form compartments therebetween; fuel ignition means threaded into said engine casing intermediate said work rotor means and said transfer rotor means; said engine casing and work rotor means further shaped to form additional compartments therebetween; means for operatively connecting said work rotor means and said transfer rotor means together; fuel-air mixture intake means and exhaust gas means formed interiorly into said work rotor means and adapted to connect with said compartments; said work rotor means, transfer rotor means and engine casing so shaped as to cause three of the said compartments to always be adjacent to each work rotor as said work rotor rotates whereby said compartments change in volume and position with time so that the following relations are true: (1) three full revolutions of the work rotor are required for any one said compartment to cyclically go through volume and position changes with time to effect intake, compression, ignition, expansion, exhausting, and exhaust scavenging; and (2) each of the three said compartments go through the above indicated volume and position changes out of phase with each other; and (3) one power impulse is imparted from the fuel ignition means to the fuel-air mixture and from thence to the work rotor per revolution of said work rotor.

References Cited
UNITED STATES PATENTS 2,920,610  1/1960  Breelle _____ 123—8 X

FOREIGN PATENTS 250,250  9/1926  Italy.

RALPH D. BLAKESLEE, *Primary Examiner.*